United States Patent [19]
Okazaki

[11] Patent Number: 5,130,844
[45] Date of Patent: Jul. 14, 1992

[54] OPTICAL WAVELENGTH CONVERTER SYSTEM
[75] Inventor: Yoji Okazaki, Kanagawa, Japan
[73] Assignee: Fuji Photo Film Co., Ltd., Kanagawa, Japan
[21] Appl. No.: 596,446
[22] Filed: Oct. 12, 1990
[30] Foreign Application Priority Data
Oct. 13, 1989 [JP] Japan .................. 1-267665
[51] Int. Cl.$^5$ .............................................. H03F 7/00
[52] U.S. Cl. .................... 359/328; 359/332; 385/122
[58] Field of Search ..................... 307/425, 427
[56] References Cited
U.S. PATENT DOCUMENTS
4,909,595 3/1990 Okazaki et al. ............... 307/427
4,959,665 9/1990 Saito et al. ................... 307/427

Primary Examiner—William L. Sikes
Assistant Examiner—Robert E. Wise
Attorney, Agent, or Firm—Sughrue, Mion, Zinn, Macpeak & Seas

[57] ABSTRACT

An optical wavelength converter system includes a semiconductor laser for emitting a laser beam, the semiconductor laser having an external resonator such as a reflective grating, and an optical wavelength converter device disposed inwardly of the resonator and comprising a bulk single-crystal of organic nonlinear optical material. The bulk single-crystal is oriented to achieve angular phase matching between a laser beam emitted from the semiconductor laser and applied to the bulk single-crystal and a wavelength-converted wave.

3 Claims, 2 Drawing Sheets

OPTICAL WAVELENGTH CONVERTER SYSTEM

BACKGROUND OF THE INVENTION

1. Field of the Invention

The present invention relates to an optical wavelength converter system, and more particularly to an optical wavelength converter system employing a optical wavelength converter device made of a bulk single-crystal of organic nonlinear optical material for converting the wavelength of a semiconductor laser beam into the wavelength of a second harmonic wave.

2. Description of the Prior Art

Japanese Unexamined Patent Publication No. 63(1988)-121829, for example, discloses an optical wavelength converter device for converting the wavelength of a laser beam which is emitted as a fundamental wave from a semiconductor laser equipped with an external resonator, into the wavelength of a second harmonic wave thereof (i.e., for shortening the wavelength of the laser beam).

As disclosed in Japanese Unexamined Patent Publication No. 62(1987)-189783, there is known a laser-diode-pumped solid-state laser in which a solid-state laser rod doped with a rare-earth material such as neodymium is pumped by a semiconductor laser. In order to obtain a laser beam having a shorter wavelength, a bulk single-crystal of nonlinear optical material is disposed in a resonator for converting the wavelength of a laser beam which is oscillated by the solid-state laser into the wavelength of a second harmonic wave.

Since the conventional laser-diode-pumped solid-state lasers with the wavelength conversion capability employ inorganic nonlinear optical materials such as KTP, LiNbO$_3$, etc., their wavelength conversion efficiency is low. This problem holds true for the aforesaid optical wavelength converter device which uses a semiconductor laser with an external resonator as a fundamental wave source.

As shown in Japanese Unexamined Patent Publication No. 63(1988)-121829, it has also been proposed to use an optical waveguide of inorganic nonlinear optical material. While the optical wavelength conversion efficiency of such an optical waveguide is high because of an increased optical power density of a fundamental wave, it is difficult to introduce the fundamental wave into the optical waveguide. An optical wavelength converter device of such arrangement is not yet practical enough since accurate control over the temperature, the magnetic field, and the ultrasonic energy is necessary in view of very strict conditions needed for phase matching between the fundamental wave and the wavelength-converted wave.

The optical wavelength converter device which comprises a laser-diode-pumped solid-state laser and a bulk single-crystal of nonlinear optical material is large in size since it employs a solid-state laser rod.

SUMMARY OF THE INVENTION

In view of the aforesaid drawbacks of the conventional optical wavelength converter devices, it is an object of the present invention to provide an optical wavelength converter system which has high optical wavelength conversion efficiency, can easily achieve phase matching between a fundamental wave and a wavelength-converted wave, and is small in size.

According to the present invention, an optical wavelength converter system includes a semiconductor laser as a fundamental wave source, the semiconductor laser having an external resonator, and an optical wavelength converter device disposed inwardly of the resonator and comprising a bulk single-crystal of organic nonlinear optical material, the bulk single-crystal being oriented to achieve angular phase matching between a laser beam emitted from the semiconductor laser and applied to the bulk single-crystal and a wavelength-converted wave.

Examples of the organic nonlinear optical material include MNA (2-methyl-4-nitroaniline), mNA (metanitroaniline), POM (3-methyl-4-nitropyridine-1-oxide), urea, NPP [N-(4-nitrophenyl)-(S)-prolinol], NPAN {2-[N-(4-nitrophenyl)-N-methylamino]acetonitrile}, DAN (2-dimethylamino-5-nitroacetoanilide), MBA-NP [2-N(α-methylbenzylamino)-5-nitropyridine) disclosed in Japanese Unexamined Patent Publication No. 60(1985)-250334, *Nonlinear Optical Properties of Organic and Polymeric Materials*, ACS SYMPOSIUM SERIES 223, edited by David J. Williams and published by American Chemical Society in 1983, *Organic Nonlinear Optical Materials* supervised by Masao Kato and Hachiro Nakanishi and published by CMC in 1985, *Nonlinear Optical Properties of Organic Molecules and Crystals* edited by D. S. Chemla and J. Zyss and published by Academic Press Inc. in 1987, and *The Quality and Performance of The Organic Non-Linear Optical Material(−)2-(α-Methylbenzylamino)-5-Nitropyridine (MBA-NP)*, Vol. 65, No. 8, Page 229, written by R. T. Bailey et al. and published by Optics Communications, and 3,5-dimethyl-1-(4-nitrophenyl)pyrazole (hereinafter referred to as "PRA"), 3,5-dimethyl-1-(4-nitrophenyl)-1,2,4-triazole, 2-ethyl-1-(4-nitrophenyl)imidazole, 1-(4-nitrophenyl)pyrrole, 2-dimethylaminol-5-nitroacetoanilide, 5-nitro-2-pyrrolidiacetoanilide, 3-methyl-4-nitropyridine-N-oxide, etc., disclosed in Japanese Unexamined Patent Publication No. 62(1987)210432. These organic nonlinear optical materials have much larger nonlinear optical constants than those of inorganic nonlinear optical materials. Since the organic nonlinear optical materials have refractive indexes which vary isotropically with temperature, their phase matching angles do not vary with changes in the temperature.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
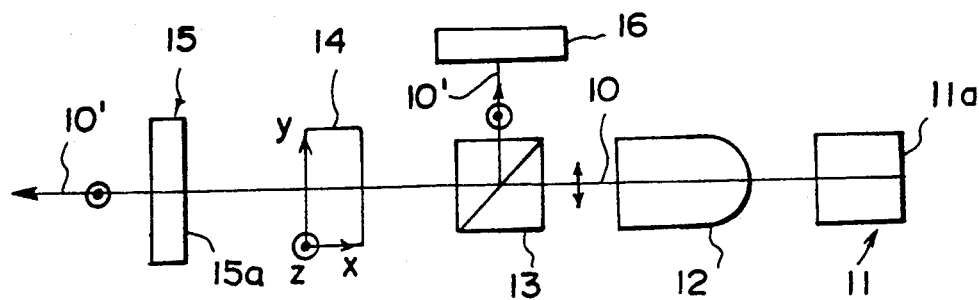
FIG. 1 is a schematic side elevational view of an optical wavelength converter system according to a first embodiment of the present invention.

Like or corresponding parts are denoted by like or corresponding reference numerals throughout the views.

FIG. 1 schematically shows an optical wavelength converter system according to a first embodiment of the present invention. The optical wavelength converter system has a semiconductor laser 11 for emitting a laser beam 10 as a fundamental wave, having a wavelength of 950 nm, a graded-index rod lens 12 serving as a collimator lens for converting the divergent laser beam 10 into a parallel beam of light, a polarizing beam splitter 13, an optical wavelength converter device 14 comprising a bulk single-crystal of organic nonlinear optical material, and a mirror 15 serving as an external resonator for the semiconductor laser 11. The semiconductor laser 11, the graded-index rod lens 12, the polarizing beam splitter 13, the optical wavelength converter device 14, and the mirror 15 are mounted in a common casing (not shown).

The semiconductor laser 11 has an end surface 11a coated with a reflective layer for reflecting 100% of the laser beam 10. The mirror 15 has an end surface 15a coated with a selective layer which can reflect substantially 100% of the laser beam 10 but transmit substantially 100% of a second harmonic wave 10' having a wavelength of 475 nm (described later on). The laser beam 10 is therefore confined between the end surface of the semiconductor laser 11 and the end surface 15a of the mirror 15 for laser oscillation. The laser beam 10 is applied to the optical wavelength converter device 14 by which it is converted into a second harmonic wave 10' having a half wavelength, i.e., 475 nm.

Figure 2:
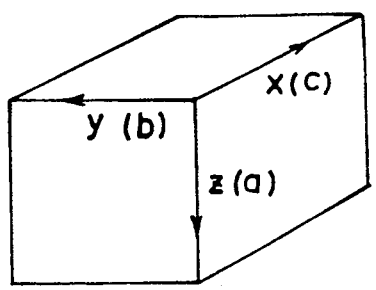
FIG. 2 is a diagram showing the structure of a bulk crystal of PRA of an optical wavelength converter device in the optical wavelength converter system shown in FIG. 1.

The optical wavelength converter device 14 will now be described below in greater detail. The optical wavelength converter device 14 comprises a bulk single-crystal of PRA. A bulk crystalline structure of PRA is shown in FIG. 2. The PRA crystal is of an orthorhombic system, and its point group is mm2. Therefore, the tensor of its nonlinear optical constants is as follows:

$$\bar{d} = \begin{pmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{pmatrix}$$

If it is assumed that optical axes x, y, z are determined with respect to crystal axes a, b, c as shown in FIG. 2, then $d_{31}$ is a nonlinear optical constant at the time a z-polarized wavelength-converted wave is extracted when light which is linearly polarized in the direction x (x-polarized light) is applied as a fundamental wave.

Similarly, $d_{32}$ is a nonlinear optical constant at the time a z-polarized wavelength-converted wave is extracted when light which is linearly polarized in the direction y (y-polarized light) is applied as a fundamental wave. Likewise, $d_{33}$ is a nonlinear optical constant at the time a z-polarized wavelength-converted wave is extracted when light which is linearly polarized in the direction z (z-polarized light) is applied as a fundamental wave, $d_{24}$ is a nonlinear optical constant at the time a y-polarized wavelength-converted wave is extracted when y- and z-polarized fundamental waves are applied and $d_{15}$ is a nonlinear optical constant at the time a z-polarized wavelength-converted wave is extracted when x- and z-polarized fundamental waves are applied.

The magnitudes of the respective nonlinear optical constants are given in the following table:

|          | (1) | (2)        |
|----------|-----|------------|
| $d_{31}$ | 26  | —          |
| $d_{32}$ | 160 | 240 ± 140  |
| $d_{33}$ | 67  | 70 ± 10    |
| $d_{15}$ | 26  | —          |
| $d_{24}$ | 160 | —          |

The values in column (1) are obtained from an X-ray crystal structure analysis and the values in column (2) are measured by the Marker Fringe process. The units are [×10$^{-9}$ esu] in both columns.

The comparison of the figure of merit indicates that the nonlinear optical constant $d_{32}$ of PRA is 260 times the non-linear optical constant $d_{31}$ of LiNbO$_3$, and about 100 times an effective nonlinear constant $d_{eff}$ of KTP.

The optical wavelength converter device 14 may be fabricated by the usual Bridgman process. More specifically, PRA in a molten state is poured into a suitable mold and quenched so that the PRA is polycrystallized. Thereafter, the PRA is gradually pulled from the furnace, which is kept at a temperature (e.g., 105° C.) higher than the melting point (102° C.) of PRA, into an outer space which is kept at a temperature lower than that melting point, thereby causing the molten PRA to be single-crystallized continuously at the point where it is withdrawn from the furnace. The PRA single-crystal thus obtained is of a highly long single-crystalline form, 50 mm long or longer, and has a uniform crystal orientation. The optical wavelength converter device 14 is therefore made sufficiently long. Since the wavelength conversion efficiency of an optical wavelength converter device of this type is proportional to the length of the device, as is well known in the art, the longer the optical wavelength converter device, the greater the practical value of the device.

The PRA single-crystal is then cut along a y-z plane containing the optical y- and z-axes (i.e., the crystal b- and a-axes), and cut to a thickness of 5 mm along the x-axis (i.e., the crystal c-axis), thereby producing the optical wavelength converter device 14 of bulk single-crystal.

Figure 3:
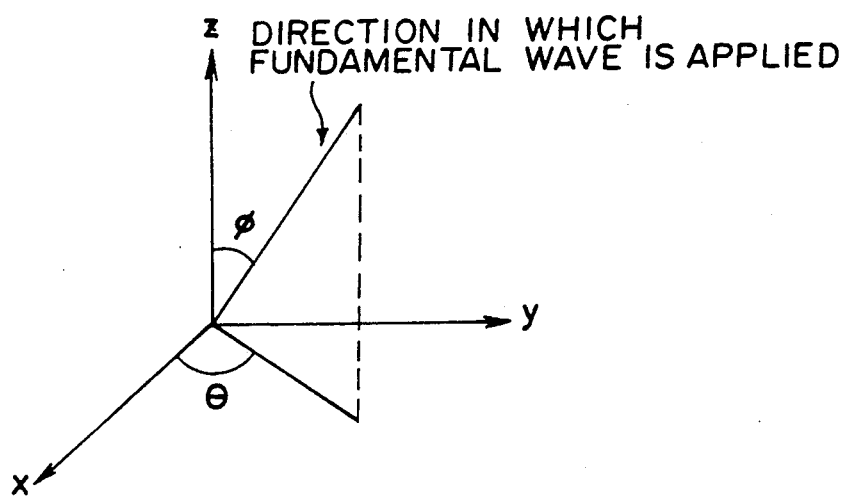
FIG. 3 is a diagram illustrating phase matching angles Φ, θ of the optical wavelength converter device.
Figure 4:
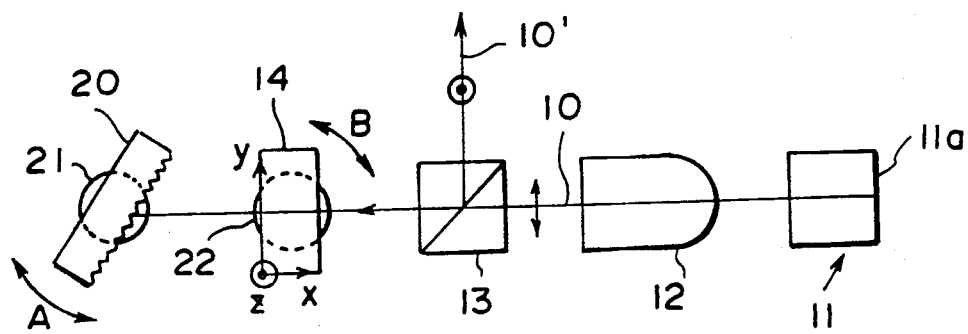
FIG. 4 is a schematic side elevational view of an optical wavelength converter system according to a second embodiment of the present invention.
Figure 5:
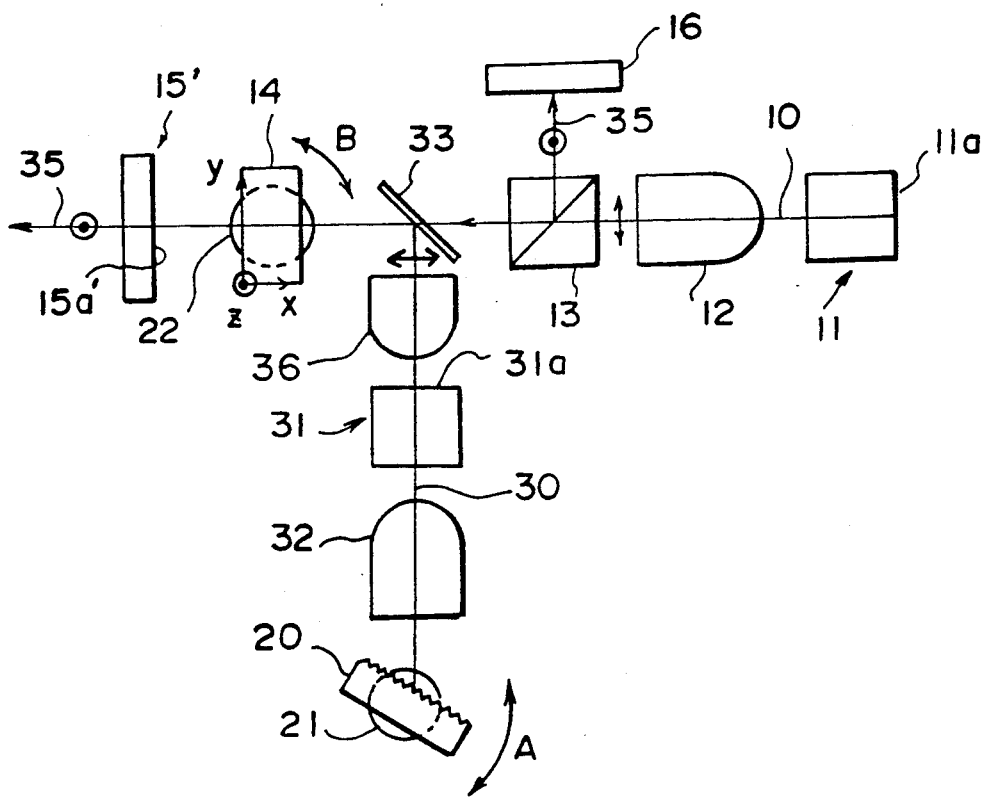
FIG. 5 is a schematic side elevational view of an optical wavelength converter system according to a third embodiment of the present invention.

As shown in FIG. 1, the linearly polarized direction of the laser beam 10 is parallel to the y-axis of the optical wavelength converter device 14. The direction in which the laser beam 10 is applied to the optical wavelength converter device 14 and the z-axis thereof form an angle of Φ=90° therebetween. The laser beam 10 is applied to the optical wavelength converter device 14 at an angle of θ=about 0° in the x-y plane, i.e., parallel to the x-axis. In FIG. 1 and also FIGS. 4 and 5 (described later), the direction in which a light beam is polarized parallel to the sheets of FIGS. 1, 4, and 5, is indicated by a symbol ↕, and the direction in which a light beam is polarized perpendicularly to the sheets of FIGS. 1, 4, and 5, is indicated by a symbol ⬤. The phase matching angles Φ, θ are shown in FIG. 3.

When the laser beam 10 is applied to the optical wavelength converter device 14, angular phase matching is achieved between the laser beam 10 as a fundamental wave and a second harmonic wave 10' thereof, and beams which are a mixture of the laser beam 10 and the second harmonic wave 10' are emitted bi-directionally from the optical wavelength converter device 14. Since the selective layer is coated on the end surface 15a of the mirror 15, only the second harmonic wave 10' having a wavelength of 475 nm passes through the mirror 15. The direction in which the second harmonic wave 10' is polarized is 90° rotated from the direction in which the laser beam 10 is polarized. The second harmonic wave 10' which is emitted to the right from the optical wavelength converter device 14 is reflected by the polarizing beam splitter 13, and then absorbed by a stopper 16. The opposite end surfaces of the optical wavelength converter device 14 are coated with a nonreflective layer which does not reflect, but passes the laser beam 10 and the second harmonic wave 10'.

It has been confirmed that the second harmonic 10' is z-polarized light. Therefore, the aforesaid very large nonlinear optical constant $d_{32}$ of PRA is utilized in this embodiment. In the case where the semiconductor laser 11 which has an output power ranging from 10 to 20 mW is employed, the optical wavelength converter system according to this embodiment has a wavelength conversion efficiency of 10% or more. Since the angular phase matching is achieved as described above, no temperature-controlling mechanism or the like is required to achieve desired phase matching.

An optical wavelength converter system according to a second embodiment of the present invention will be described below with reference to FIG. 4.

In the second embodiment, a reflective grating 20 is used in place of the mirror 15 in the first embodiment. The reflective grating 20 is mounted on a rotatable shaft 21 so that it can rotate in the direction indicated by the arrow A to change the direction in which the laser beam 10 is applied to the reflective grating 20. The optical wavelength converter device 14 is also mounted on a rotatable shaft 22 so that it can rotate in the direction indicated by the arrow B to change the direction in which the laser beam 10 is applied to the optical wavelength converter device 14.

In response to the rotation of the reflective grating 20, the wavelength at which the semiconductor laser 11 oscillates can vary in the range from 950 to 1,000 nm. When the wavelength of the laser beam 10 is thus varied, the phase matching angle $\Phi$ remains 90° as with the first embodiment, but the phase matching angle $\theta$ varies with the wavelength of the laser beam 10. The phase matching angle $\theta$ can therefore be set to a suitable value when the optical wavelength converter device 14 is rotated. In the second embodiment, when the wavelength of the laser beam 10 varies in the range from 950 to 1,000 nm, desired angular phase matching can be achieved when the phase matching angle $\theta$ is selected in the range from about 0° to about 10°.

The optical wavelength converter system according to the second embodiment can thus produce a second harmonic wave 10' whose wavelength is variable in the range from 475 to 500 nm. The second harmonic wave 10' thus generated is emitted bi-directionally from the optical wavelength converter device 14. The second harmonic wave 10' which is emitted to the right is reflected by the polarizing beam splitter 13, and directly upwardly for use.

An optical wavelength converter system according to a third embodiment of the present invention will be described below with reference to FIG. 5.

In the third embodiment, a second semiconductor laser 31 for emitting a laser beam 30 having a variable wavelength $\lambda_2$ is used in addition to the semiconductor laser 11 which emits a laser beam 10 having a wavelength $\lambda_1 = 950$ nm. The second semiconductor laser 31 is associated with rod lenses 32, 36 each identical to the rod lens 12 and a reflective grating 20 as an external resonator. A mirror 15' is coated on an end surface 15a' with a layer for reflecting substantially 100% of the laser beam 30. Therefore, the laser beam 30 is confined between the mirror 15' and the reflective grating 20 for laser oscillation.

The optical wavelength converter device 14 is mounted on a rotatable shaft 22 for rotation in the direction indicated by the arrow B.

In response to rotation of the reflective grating 20, the wavelength at which the semiconductor laser 31 oscillates can vary in the range from 950 to 1,000 nm. The laser beam 30 which has a wavelength $\lambda_2$ ranging from 950 to 1,000 nm is combined with the laser beam 10 having a wavelength $\lambda_1$ of 950 nm by a half mirror 33, and the combined laser beams 10, 30 are applied to the optical wavelength converter device 14. Then, the laser beams 10, 30 are converted into a sum-frequency laser beam 35 having a wavelength $\lambda_3$ ($1/\lambda_3 = 1/\lambda_1 + 1/\lambda_2$) by the optical wavelength converter device 14. With the wavelengths $\lambda_1$, $\lambda_2$ being selected above, the wavelength $\lambda_3$ of the sum-frequency laser beam 35 is variable in the range from 475 to 487 nm. The layer coated on the end surface 15a' of the mirror 15' reflects the laser beam 10 having a wavelength $\lambda_1$ as well as the laser beam 30 having a wavelength $\lambda_2$, but passes substantially 100% of the sum-frequency laser beam 35 having a wavelength $\lambda_3$.

In the third embodiment, the phase matching angle $\Phi$ remains 90° as with the first embodiment, but the phase matching angle $\theta$ varies with the wavelength $\lambda_2$ of the laser beam 30. The phase matching angle $\theta$ can therefore be set to a suitable value when the optical wavelength converter device 14 is rotated. In the third embodiment, when the wavelength $\lambda_2$ of the laser beam 30 varies in the range from 950 to 1,000 nm, desired angular phase matching can be achieved when the phase matching angle $\theta$ is selected in the range from about 0° to about 10°.

The optical wavelength converter system according to the third embodiment can thus obtain substantially the same wavelength conversion efficiency as that of the optical wavelength converter systems according to the first and second embodiments.

While the laser beam 10 and the laser beam 30 are converted into the sum-frequency laser beam 35 in the third embodiment, the optical wavelength converter device according to the present invention can convert the laser beams 10, 30 into a difference-frequency laser beam.

As described above, since the optical wavelength converter device of the optical wavelength converter system according to the present invention is made of an organic nonlinear optical material having a very high nonlinear optical constant, it has much higher optical wavelength conversion efficiency than that of the conventional optical wavelength converter device which is made of an inorganic nonlinear optical material.

Since the phase matching angle of the organic nonlinear optical material does not vary with temperature, the optical wavelength converter device can easily achieve phase matching without the need for a complex temperature-controlling mechanism, and hence can be small in size.

The optical wavelength converter system according to the present invention, which does not require a large-size solid-state laser rod, is smaller in size than the conventional optical wavelength converter system which employs as a fundamental wave source a solid-state laser rod pumped by a semiconductor laser.

Although certain preferred embodiments have been shown and described, it should be understood that many changes and modifications may be made therein without departing from the scope of the appended claims.

I claim:

1. An optical wavelength converter system comprising:
   i) a semiconductor laser for emitting a laser beam, said semiconductor laser having an external resonator; and
   ii) an optical wavelength converter device disposed inwardly of said resonator and comprising a bulk single-crystal of organic nonlinear optical material;
   iii) said bulk single-crystal being oriented to achieve angular phase matching between the laser beam, emitted from said semiconductor laser and applied to said bulk single-crystal, and a wavelength-converted wave.

2. An optical wavelength converter system according to claim 1, wherein said external resonator comprises a reflective grating rotatable in a direction to change the angle at which said laser beam is applied to said reflective grating, said optical wavelength converter device being rotatable in a direction to change the angle at which said laser beam is applied to said optical wavelength converter device, said bulk single-crystal being capable of converting said laser beam into a second harmonic wave thereof.

3. An optical wavelength converter system according to claim 1, further comprising a second semiconductor laser for emitting a laser beam provided with an external resonator wherein at least one of the external resonators of said semiconductor lasers comprises a reflective grating rotatable in a direction to change the angle at which the laser beams emitted from the semiconductor lasers are applied to said reflective grating, said bulk single-crystal of organic nonlinear optical material being rotatable in a direction to change the angle at which said laser beams are applied thereto, said bulk single-crystal being capable of converting said laser beams into a sum-frequency or difference-frequency laser beam.

* * * * *